(12) United States Patent
Ogawa et al.

(10) Patent No.: US 6,396,551 B1
(45) Date of Patent: May 28, 2002

(54) BOX STRUCTURE FOR TV-VCR COMBO

(75) Inventors: Masuo Ogawa; Tomoaki Kibino, both of Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/538,271

(22) Filed: Mar. 30, 2000

(30) Foreign Application Priority Data

Mar. 30, 1999 (JP) ............................................. 11-002008

(51) Int. Cl.$^7$ ............................ H04N 5/64; A47B 81/06
(52) U.S. Cl. ........................................ 348/836; 312/7.2
(58) Field of Search .............................. 312/7.2, 223.1, 312/223.2; 348/836, 825; 361/681, 682, 683; 248/917, 918

(56) References Cited

U.S. PATENT DOCUMENTS

| | | | |
|---|---|---|---|
| 4,635,809 A | * | 1/1987 | Bachman et al. ......... 312/7.2 X |
| 5,122,928 A | * | 6/1992 | Lo ........................... 312/7.2 X |
| 5,305,110 A | * | 4/1994 | Taki et al. .................. 348/836 |
| 5,363,150 A | * | 11/1994 | Kojima ..................... 312/7.2 X |
| 5,730,512 A | * | 3/1998 | Heirich ....................... 312/7.2 |
| 5,863,106 A | * | 1/1999 | Beak ...................... 348/836 X |

FOREIGN PATENT DOCUMENTS

| | | | | |
|---|---|---|---|---|
| JP | 58-121880 | * | 7/1983 | ................. 312/7.2 |
| JP | 61-75162 | | 5/1986 | |
| JP | 3-112449 | | 11/1991 | |
| JP | 4-151010 | | 5/1992 | |

* cited by examiner

Primary Examiner—James O. Hansen
(74) Attorney, Agent, or Firm—Crowell & Moring LLP

(57) ABSTRACT

In a box structure for a TV-VCRcombo in which a CRT as a TV image display unit and a VCR are accommodated in a box unit and in which a fly-back transformer installation frame is detachably provided on an internal side wall of the box unit, the fly-back transformer installation frame is detachably slid into a main body of the box unit through cooperation between a rail-like guide portion provided on the side wall of the box unit and an insertion piece provided on the fly-back transformer installation frame; a hook member for preventing a dislocation of the fly-back transformer installation frame is provided on the box unit main body at a position where the fly-back transformer installation frame is mounted in place; an erect wall portion is formed on the fly-back transformer installation frame so that the hook member locks; and a hook disengagement preventing portion is formed on the erect wall portion for preventing a movement in a direction perpendicular to the hooking movement of the hook member.

6 Claims, 3 Drawing Sheets

BOX STRUCTURE FOR TV-VCR COMBO

BACKGROUND OF THE INVENTION

1. Field of the Invention

The present invention relates to a resin cabinet for a TV-VCRcombo in which a resin component installation frame unit for mainly installing therein a fly-back transformer is detachably mounted in a resin box unit main body via rail-like guide portions formed in the box unit main body, and more particularly to a resin cabinet for a TV-VCRcombo in which hook members are formed at positions where the component installation frame unit is properly mounted in the box unit main body for preventing the dislocation of the component installation frame from its installed position.

2. Description of the Related Art

Conventionally, with hook members formed on a box unit main body of a resin cabinet for a TV-VCRcombo, as shown in FIGS. 5(a) and 5(b), since a pawl portion 51 at a leading end of a hook member 5 is just hooked on a wall portion 41 of a component installation frame unit 4, if a certain magnitude of downward load F is applied to the component installation frame unit 4, then, the hook member 5 is flexed and therefore there happens a problem that the pawl portion 51 of the hook member 5 is disengaged from the wall portion 41, whereby the component installation frame unit 4 is eventually dislocated from the box unit main body. In other words, since a fly-back transformer of relatively heavy weight is installed in the component installation frame unit 4, the downward load F is applied to the frame unit 4, and there sometimes happens a problem that the hook member 5 is disengaged from the wall portion 41 due to, for example, vibrations generated when the cabinet is carried.

SUMMARY OF THE INVENTION

The present invention was made to solve the problem described above and an object thereof is to provide a cabinet for a TV-VCRcombo which can prevent the disengagement of hook members with a simple construction, which can securely prevent the dislocation of a component installation frame unit for mainly installing a fly-back transformer from the hook members which lock the component installation frame unit, and which can thereby prevent the disassembling of the component installation frame unit from the cabinet.

In order to achieve the above object, according to the invention, there is provided a box structure for a TV-VCRcombo in which a CRT as TV image display means and a VCR are accommodated in a box unit and in which a fly-back transformer installation frame is detachably provided on an internal side wall of the box unit, the box structure wherein: the fly-back transformer installation frame is detachably slid into a main body of the box unit through cooperation between a rail-like guide portion provided on the side wall of the box unit and an insertion piece provided on the fly-back transformer installation frame; a hook member for preventing a dislocation of the fly-back transformer installation frame is provided on the box unit main body at a position where the fly-back transformer installation frame is mounted in place; an erect wall portion is formed on the fly-back transformer installation frame so that the hook member locks thereon; and a hook disengagement preventing portion is formed on the erect wall portion for preventing a movement in a direction perpendicular to the hooking movement of the hook member.

DETAILED DESCRIPTION OF THE PREFERRED EMBODIMENTS

Figure 1:
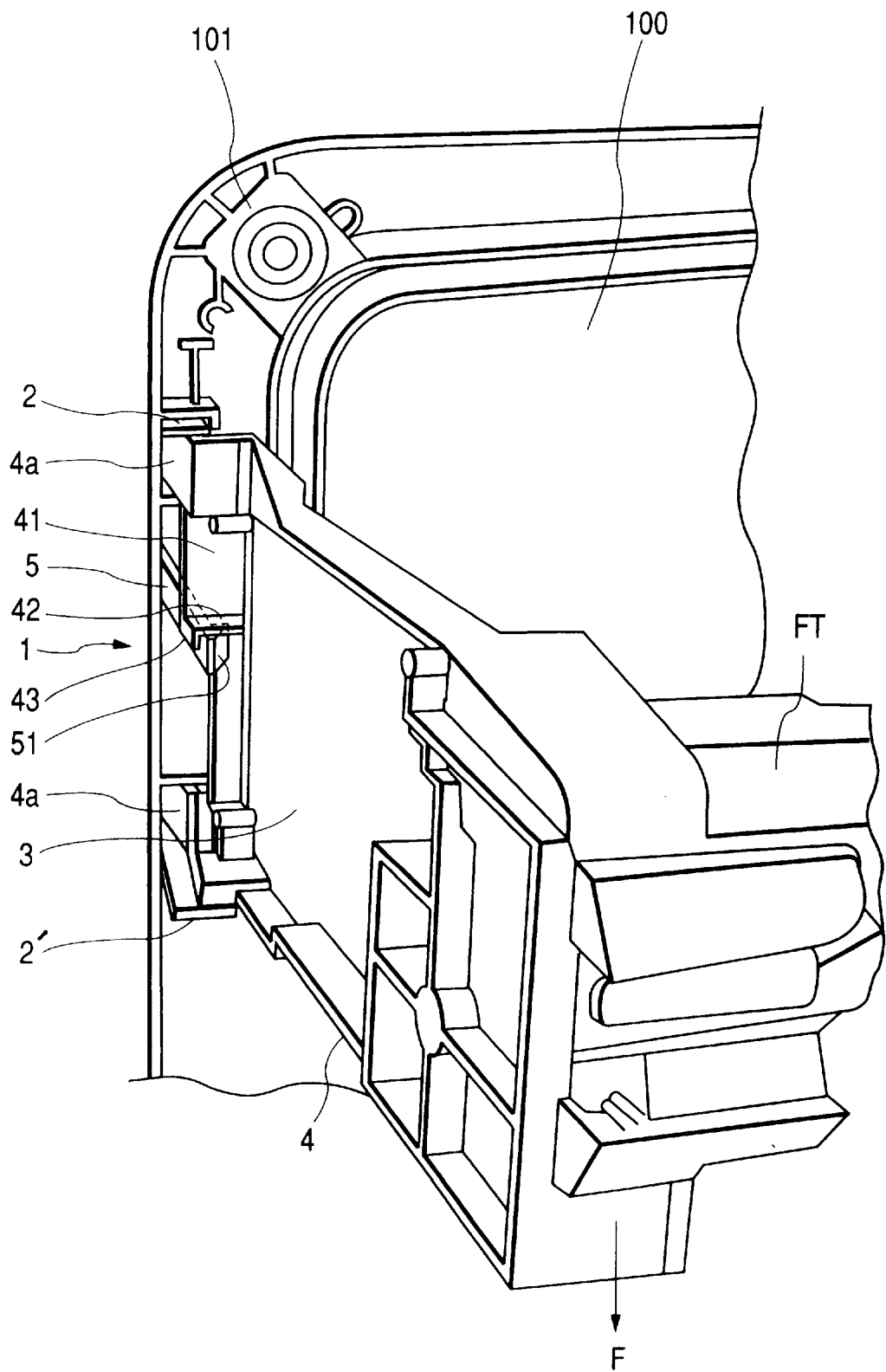
FIG. 1 is a perspective view of a part of a cabinet for a TV-VCRcombo according to the invention where a component installation frame unit is mounted.

Referring to the drawings, described below will be a mode for carrying out a cabinet for a TV-VCRcombo according to the invention.

Figure 2:
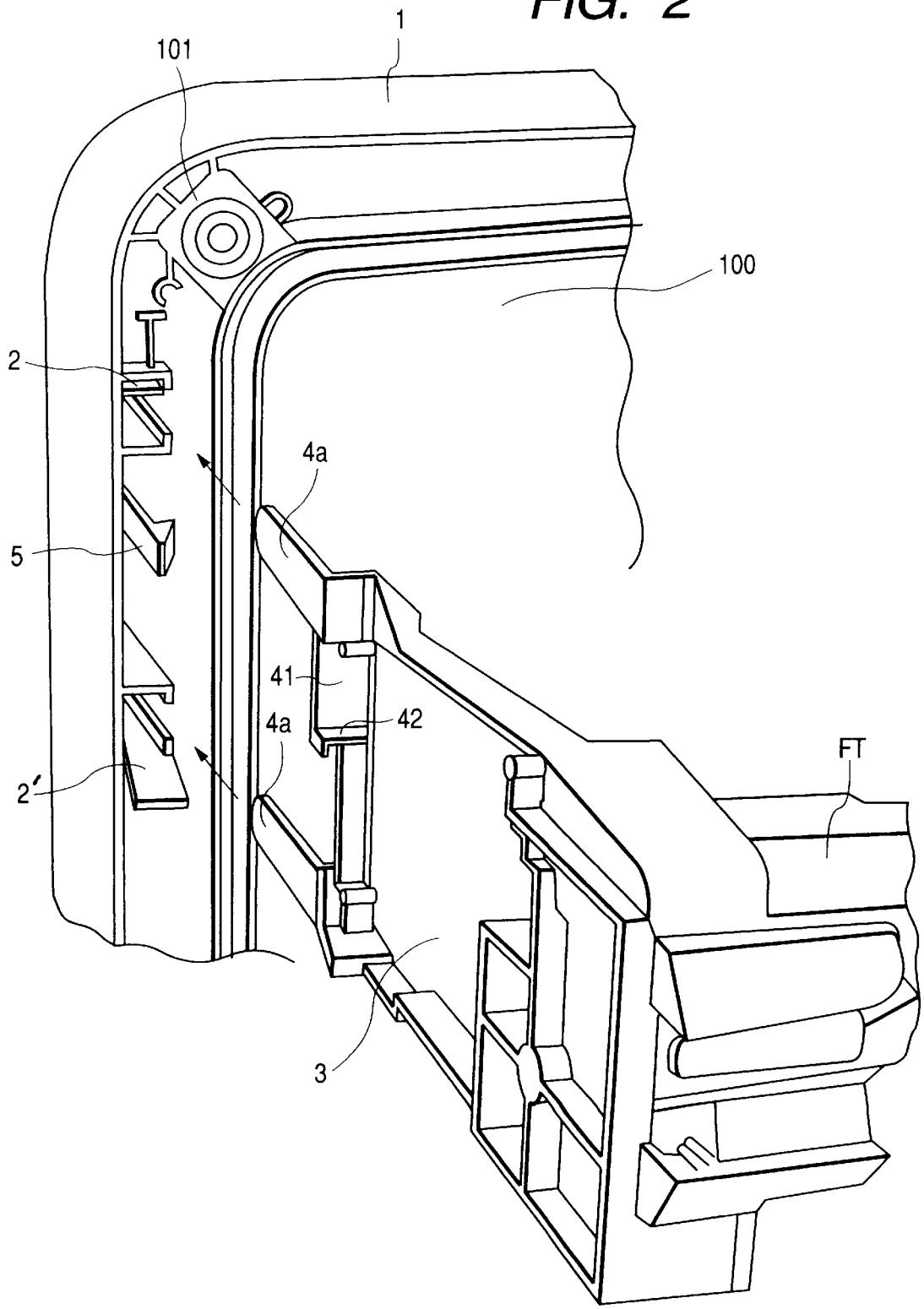
FIG. 2 is a perspective view of the same part of the cabinet showing a state prior to the component installation frame unit being mounted.
Figure 3:
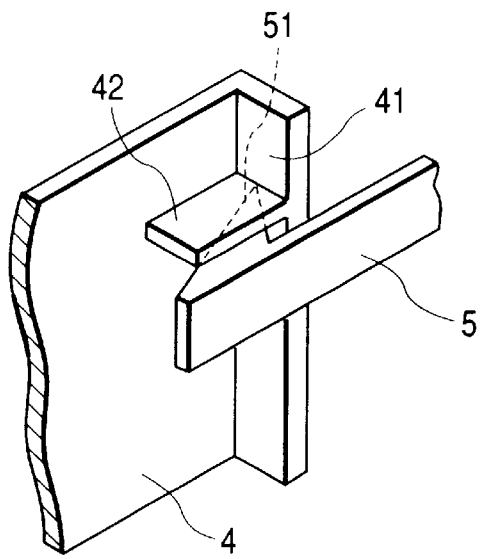
FIG. 3 is a perspective view of a main part according to a first embodiment in which a hook member is locked on a wall portion of a component installation frame unit.
Figure 4:
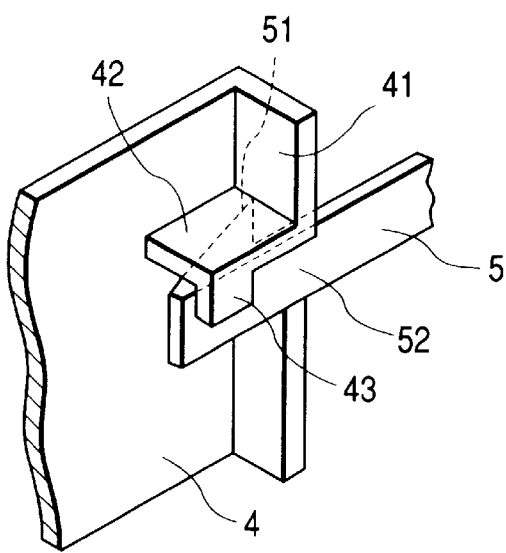
FIG. 4 is a perspective of a main part according to a second embodiment in which a hook member is locked on a wall portion of a component installation frame unit.
Figure 5A:
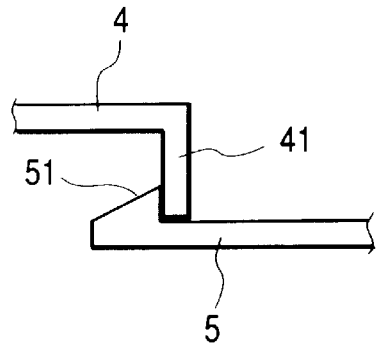
FIG. 5(a) is a plan view showing a locking structure in which a conventional hook member is locked to a wall portion.
Figure 5B:
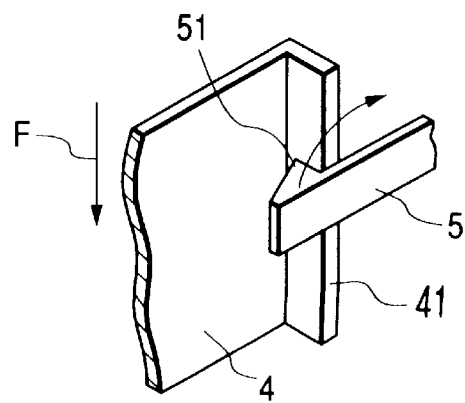
FIG. 5(b) is a partial perspective view showing the same.

FIG. 1 is a perspective view of a part of a cabinet for a TV-VCRcombo according to the invention where a component installation frame unit is mounted, FIG. 2 is a perspective view of the same part of the cabinet showing a state prior to the component installation frame unit being mounted, FIG. 3 is a perspective view of a main part according to a first embodiment in which a hook member is locked on a wall portion of a component installation frame unit and FIG. 4 is a perspective of a main part according to a second embodiment in which a hook member is locked on a wall portion of a component installation frame unit. In the figures, reference numeral 100 denotes a CRT (Cathode Ray Tube), and reference numeral 101 denotes a mounting portion of the CRT where the CRT is mounted in a box unit main boy 1. While a VCR deck is not shown, it is normally to be disposed under the CRT.

As shown in FIGS. 1 and 2, in a cabinet for a TV-VCR combo according to an embodiment of the invention, two linear rail-like guide portions 2, 2' are formed at upper and lower portions of an internal side of the resin box unit main body 1 comprising a front cabinet, and a resin component installation frame unit 4 installing therein a base plate 3 for a fly-back transformer FT is detachably mounted between these rail-like guide portions 2, 2'. In other words, two knife-like insertions pieces 4a are provided on the frame unit 4 in such a manner as to extend 2'. In other words, two knife-like insertions pieces 4a are provided on the frame unit 4 in such a manner as to extend sideward, and the frame unit 4 is mounted in the box unit main body 1 when these insertion pieces 4a are allowed to enter into the guide portions 2, 2', respectively.

There is formed on the box unit main body 1 between the rail-like guide portions 2, 2' a hook member 5 having a large elongate pawl portion 51, whereas there is provided on the component installation frame unit 4 an erect wall portion 41 where the pawl portion 51 of the hook member 5 is locked. Formed on this erect wall portion 41 is a plate-like abutment portion (a hook disengagement preventing portion) 42 for preventing the movement of the hook member 5 in a direction perpendicular to its hooking movement.

Namely, this abutment portion 42 is, as shown in FIG. 3, formed at an upper portion on the erect wall portion 41 on which the hook member 5 is locked so as to prevent the disengagement of the hook member 5 in an upward direction.

In addition, as shown in FIG. 4, it is desirable to provide a projection 43 on the abutment portion 42 at a position confronting a side of the hook member 5 at a leading end thereof so as to lock an upper portion of a front side 52 of the hook member 5 to thereby prevent the frontal disengagement of the hook member 5.

Thus, even if the heavy weight of the fly-back transformer installation frame is applied downwardly, and moreover even if the fly-back transformer installation frame is subject to vibrations caused when the cabinet is carried, there is no risk of the hook members 5 disengaging from the erect wall portions 41.

What is claimed is:

1. A box structure for a TV-VCR combo in which a CRT for displaying a TV image and a VCR are accommodated, along with a detachable fly-back transformer, the box structure comprising:

a box unit main body;

a fly-back transformer installation frame detachably coupleable with an internal vertical side wall of said box unit main body;

wherein said fly-back transformer installation frame is detachably slidable into the box unit main body through cooperation between a rail guide portion provided on the vertical side wall of said box unit main body and an insertion piece provided on said fly-back transformer installation frame;

a hook member for preventing a dislocation of said fly-back transformer installation frame is provided on said box unit main body at a position at which said fly-back transformer installation frame is to be mounted;

an erect wall portion is formed on said fly-back transformer installation frame so that said hook member locks thereon; and a hook disengagement preventing portion is formed on said erect wall portion for preventing a movement in a direction perpendicular to a hooking movement of said hook member.

2. The box structure according to claim 1, wherein said hook member is provided between two of said rail guide portion and said erect wall portion is provided between two of said insertion piece.

3. The box structure according to claim 1, wherein a projection is provided on said hook disengagement preventing portion to prevent a frontal disengagement of said hook member.

4. The box structure according to claim 1, wherein said hook disengagement preventing portion abuts the hook member.

5. A box structure for electronic components which are accommodated therein, the box structure comprising:

a box unit having a main body;

a component installation frame detachably slidable into the main body of said box unit through cooperation between a rail guide portion provided on an internal vertical side wall of said box unit and an insertion piece provided on said installation frame;

a hook member for preventing a dislocation of said installation frame being provided on said box unit main body at a position at which said installation frame is to be mounted;

an erect wall portion is formed on said installation frame so that said hook member locks thereon; and a hook disengagement preventing portion is formed on said erect wall portion for preventing a movement in a direction perpendicular to a hooking movement of said hook member, wherein said hook member is provided between two of said rail guide portion and said erect wall portion is provided between two of insertion piece.

6. A box structure for electronic components which are accommodated therein, the box structure comprising:

a box unit having a main body;

a component installation frame detachably slidable into the main body of said box unit through cooperation between a rail guide portion provided on an internal vertical side wall of said box unit and an insertion piece provided on said installation frame;

a hook member for preventing a dislocation of said installation frame being provided on said box unit main body at a position at which said installation frame is to be mounted;

an erect wall portion is formed on said installation frame so that said hook member locks thereon; and a hook disengagement preventing portion is formed on said erect wall portion for preventing a movement in a direction perpendicular to a hooking movement of said hook member, wherein a projection is provided on said hook disengagement preventing portion to prevent a frontal disengagement of said hook member.

* * * * *